United States Patent [19]
Allen et al.

[11] 4,393,998
[45] Jul. 19, 1983

[54] TUBE CLAMP

[75] Inventors: Walter E. Allen, Prospect, Conn.; Douglas D. Wilson, Huntington, W. Va.

[73] Assignee: Transamerica DeLaval Inc., Princeton, N.J.

[21] Appl. No.: 285,401

[22] Filed: Jul. 20, 1981

[51] Int. Cl.³ .............................................. F16L 3/08
[52] U.S. Cl. ................................ 248/74 R; 156/306.9
[58] Field of Search ..................... 248/74 R, 74 B, 70, 248/68 R, 60, 56, 55; 285/DIG. 16, 419, 373; 156/306.9, 331.2

[56] References Cited

U.S. PATENT DOCUMENTS

| | | | |
|---|---|---|---|
| 2,586,587 | 2/1952 | Wendt | 156/306.9 |
| 2,709,558 | 5/1955 | Young | 248/74 B |
| 2,790,614 | 4/1957 | Miller | 248/74 R |
| 3,723,223 | 3/1973 | Le Compte | 156/306.9 |
| 4,006,874 | 2/1977 | McGee | 248/74 R |

Primary Examiner—William H. Schultz
Assistant Examiner—Ramon O. Ramirez
Attorney, Agent, or Firm—Hopgood, Calimafde, Kalil, Blaustein & Judlowe

[57] ABSTRACT

The invention contemplates tube-clamp structure wherein a split wear sleeve is applied to a metal tube with such resistance to displacement along the tube that displacement wear is accommodated essentially only via the lesser displacement resistance which characterizes a limited axial range of support-clamp engagement around the sleeve. More particularly, the split sleeve has a bonded lining of friction material which contains heat-curable adhesive—so that in a sufficiently elevated ambient temperature environment, as in the vicinity of an aircraft engine, the sleeve will bond to the metal tube; and so that in a lesser ambient-temperature environment, as within an aircraft wing which is subject to flexure, the sleeve will not bond to the metal tube but rather will be displaceable on the metal tube only for such unusual situations of axial play as the clamp-to-sleeve engagement will not accommodate.

4 Claims, 3 Drawing Figures

TUBE CLAMP

BACKGROUND OF THE INVENTION

The invention relates to mounting clamps for tubing and in particular to tube clamps for hydraulic tubing used in environments which can cause wear between tube and clamp.

Clamps of the character indicated are used in aircraft construction, for support of hydraulic tubing in various environments, involving for example relatively great longitudinal displacement as in the course of wing flexure, lesser longitudinal displacement as in the case of vibratory oscillation, and elevated temperature as in the vicinity of an engine. These are among the problems addressed in U.S. Pat. No. 4,006,874, to which reference is made for a more complete discussion. And reference may also be had to the patents cited in prosecution of said U.S. Pat. No. 4,066,874, for prior art against which to evaluate the background.

In particular, said U.S. Pat. No. 4,006,874 purports to solve the indicated problems by so devising the frictional engagement of a split sleeve to a tube, in the context of support-clamp engagement to the sleeve, that less friction characterizes the latter engagement than is the case for the sleeve-to-tube engagement. The sleeve has raised end shoulders between which the clamp-to-sleeve engagement is preferentially displaceable, yet in the case of unusual need, the clamp will engage one of the shoulders to displace the sleeve on the tube. In practice, the friction of sleeve-to-tube engagement is not enough to provide real assurance against sleeve wear on the tube, and integrity of the hydraulic system is accordingly threatened. Also, in the relatively high-heat environment of an engine, no sleeve displacement on the tube can ever be tolerated; in this latter situation, it has become the practice to braze the sleeve to the tube, an expensive practice which severely limits maintenance in the field.

BRIEF STATEMENT OF THE INVENTION

It is an object of the invention to provide an improved tube clamp of the character indicated, avoiding or substantially reducing above-noted limitations of the prior art.

It is a specific object to produce a clamp of the character indicated which will exhibit greater frictional resistance to such large longitudinal displacements as require a repositioning of the sleeve on the tube, and which also wil be inherently capable of bonding the sleeve to the tube in the presence of a sufficiently elevated temperature, such as the ambient temperature environment of an operating engine.

It is another specific object to achieve the above objects with structure having the snap-on ease of assembly which characterizes devices according to U.S. Pat. No. 4,006,874 and also requiring no additional tooling or procedural steps in order to achieve a sleeve-to-tube bond in an engine-installed environment.

It is a general object to achieve the foregoing objects at negligible incremental cost over prior devices, while materially reducing the complexities and problems of maintenance.

The invention achieves the foregoing objects and certain other features by providing a liner of friction material bonded to the bore of the sleeve; the friction material includes uncured thermosetting adhesive, with all necessary curing agents, the same being selected for its inherent ability to cure in the context of installed-clamp pressure and ambient engine heat, of say, at least 300° F. The adhesive is also selected for its ability to withstand the most elevated engine-environment temperatures, as in the order of 500° F., without material degradation of the sleeve-to-tube bond.

DETAILED DESCRIPTION

The invention will be described in detail for a preferred form, in conjunction with the accompanying drawings, in which.

Figure 1:
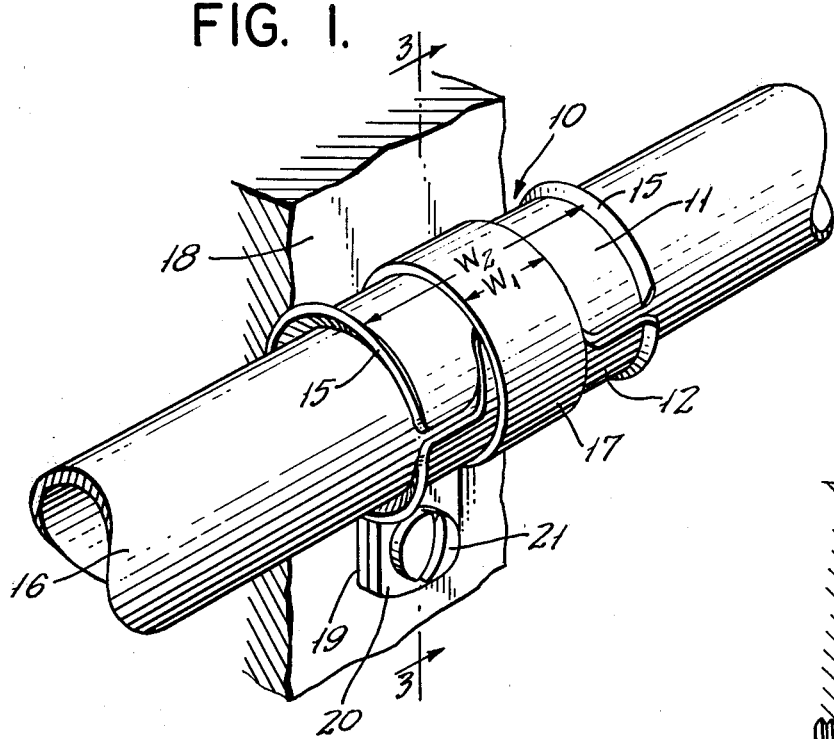
FIG. 1 is a perspective view of a tube clamp of the invention, installed and supporting a length of tubing.
Figure 3:
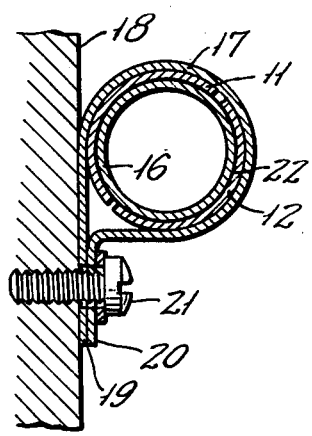
FIG. 3 is a sectional view taken at 3—3 in FIG. 1.
Figure 2:
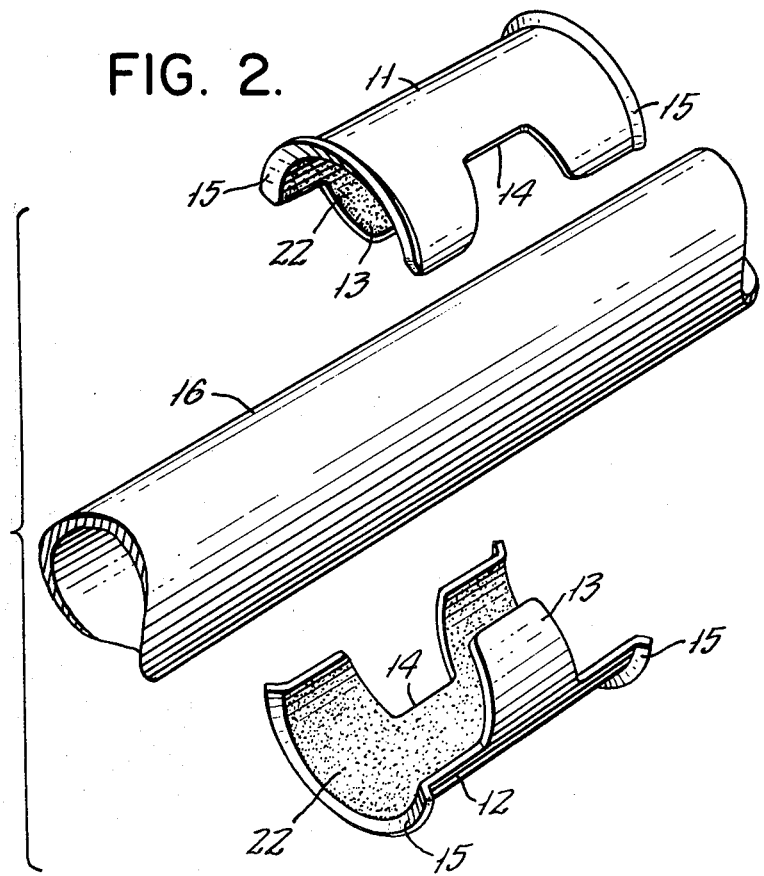
FIG. 2 is an exploded perspective view of the split halves of a sleeve component of the clamp of FIG. 1.

In FIG. 1 the clamp of the invention is generally designated, at 10. It comprises two identical clamp-shell components 11–12 which are of semi-cylindrically formed metal, such as stainless steel with interfitting projection and recess formations 13–14 along their respective longitudinal edges. An outward flare 15 at each longitudinal end provides a substantially complete circumferential shoulder at each end of the sleeve when shells 11–12 are fitted to a local length of hydraulic tubing 16. The total arcuate extent of each shell 11(12), including the arcuate projection 13 of one of its longitudinal edges, exceeds 180° of tube (16) circumference, and the material of each shell is stiffly compliant; so that each shell is transiently deformed in the course of snap-action assembly to tube 16, for self-retention of such assembly.

The clamp by which tube 16 and its assembled sleeve 11–12 are mounted to frame structure 18 is a formed strap 17 of stiffly compliant sheet metal, of width $W_1$ less than the effective span $W_2$ between end-shoulder formations 15. As shown, strap 17 has a central body extending for substantially 270° of circumferential wrap of sleeve 11–12, with substantial axial-end clearance within the span $W_2$, and terminating with a tangential frame-seating end 19 and a 90°-bent clamp-setting opposite end 20. A bolt 21 sets and mounts the clamp 10 to frame structure 18, which may, in an aircraft application, be either on or near an engine (high-heat environment, in the context of relatively little flexure) or within a wing or other flexed part of the aircraft (low-heat environment, in the context of relatively great flexure); in either case, the context may include vibratory oscillation, attributable to various causes.

In accordance with the invention, a thin lining 22 of friction material is bonded to the tube-engaging concave surface of each of the sleeve halves. For the case of tubing 16 of one-inch outer diameter, the lining 22 may suitably be a film of 0.010-inch thickness. The friction material includes uncured thermosetting adhesive, with all necessary curing agents, and selection is made based on inherent ability to cure in the presence of ambient engine heat for a normally loaded engine, for example, a minimum ambient temperature of 300° F., in the context of such radial compression of liner 22, e.g. in the range 100 to 200 psi, as is developed upon securing clamp 10 at 21, when mounting the same to frame structure 18 in accordance with customary installation procedure.

The friction material of liner 22 preferably incorporates both elastomeric and thermoset resin components, and a commercially available nitrite rubber-phenolic resin tape* has been found to produce an excellent sleeve-to-tube bond, in the indicated environment of heat and pressure. Such tape is complete with necessary components for curing, i.e. no primer or other ingredient is needed to obtain satisfactory bonds. Such tape is also unsupported, i.e., it is a film which does not contain cloth, paper or any other type of carrier. In practice, a quantity of such film is cookie-cut to desired liner outline, and it is sufficiently adhered to the cleaned concave metal surface of each shell 11(12), using methyl ethyl ketone or acetone to create a sufficiently tacky surface for retained assembly to each shell. Two shells 11-12, thus lined with uncured friction material, a clamp strap 17 and a bolt 21 complete the structural components needed by the customer. The sleeve halves 11-12 snap into self-retaining axially interlocked relation on the tubing; the strap 17 snaps into circumferential engagement with sleeve 11-12, and the secured bolt 21 to the frame 18 applies the requisite pressure to liner 22, whether the clamp is to be exposed to a bonding heat environment or is to develop elevated friction in a non-bonding environment. By elevated friction is meant that sleeve-to-tube friction, for an uncured lining and in a clamp-set situation, is not only well in excess of the clamp(17)-to-sleeve (11-12) friction which is designedly low for accommodation of wear-inducing displacements, but it is also well in excess of the sleeve (11-12)-to-tube (16) friction which is characteristic of the unlined sleeve halves of U.S. Pat. No. 4,006,874.

*"Plastilock 655", a product of B. F. Goodrich, Akron, Ohio

Tests made for tube clamps of the indicated size, i.e. for clamping one-inch outside-diameter tubing 16, will serve to illustrate the foregoing discussion with regard to frictional resistance and bonding effectiveness. In each case, a laboratory test fixture was employed, comprising a hydraulic cylinder with a 2.5-inch bore and rated at 3000 psi. This cylinder draws toward itself a ¾-inch diameter threaded steel rod. A one-inch (I.D.) steel sleeve surrounds the threaded rod. A steel nut is threaded to the rod and is used to force a length of tubing 16 into the sleeve. The clamp-shell assembly 10 abuts the sleeve end and is placed in shear when hydraulic pressure is applied to the cylinder. The cylinder effective area is 4.123 in.$^2$, so that a 10 psi cylinder load results in a 41-lb. shear force on the clamp-shell assembly 10.

For initial test to obtain a reference magnitude, as a basis for later comparison with the lined-sleeve clamp of the invention, an unlined-sleeve clamp 10 was set to a one-inch diameter stainless-steel tube 16. A hydraulic cylinder pressure of 18 psi, meaning a shear force of 74 lbs., was needed to displace the clamp shell 10 on the tube 16.

Next, the test was repeated, using a clamp-shell assembly 10 wherein the sleeve halves 11-12 were lined with uncured Plastilock 655, i.e. there was no bonding to the tubing 16. A cylinder pressure of 60 psi, meaning a shear force of 247 lbs., was required, to displace the clamp shell 10 on the tube 16; this is more than three times the displacement resistance of the reference (unlined) configuration.

Thereafter, the test was repeated for various temperature-time combinations of curing different successive clamp-shell assemblies 10 to tubing 16. In one such test, wherein a heat environment of 375° F. was provided for 15 minutes, it was impossible to displace the bonded clamp-shell assembly 10 on the tube 16, because the end of tube 16 collapsed and rolled into a flare when the hydraulic cylinder pressure reached 1100 psi, meaning 4535 lbs. of shear force acting on the bonded assembly of clamp 10 to tube 16. After this collapse, the bonded parts were inspected, and the bond between parts 11-12 and 16 was found to be intact.

In various subsequent tests, involving one-hour heat soaks at successively greater temperatures, the bonding proved effective, but less effective than for the above-noted cure at 375° F.

Finally, to determine bonding efficacy at simulation of an elevated ambient temperature of 500° F. in the vicinity of an engine, a specimen lined clamp-shell assembly 10 on a tube 16 was cured at 1000° F. for 30 minutes, then cooled to 500° F. for shear-strength determination at such an elevated ambient temperature. The test was run up to 500 psi of hydraulic cylinder pressure, meaning 2062 lbs. of shear force on the sleeve(11-12)-to-tube (16) bond, without displacing the assembly 10 on the tubing 16.

The described tube clamp 10, with friction liner 22, will be seen to meet all stated objects. Not only is resistance to sleeve displacement substantially increased for the uncured unbonded situation, but the bonding power of the cured situation provides a major increase in holding power of the clamp assembly. And bond strength is still substantial both at elevated ambient temperature and after exposure to even greater ambient temperature.

While the invention has been described in detail for a preferred embodiment, it will be understood that modifications may be made without departing from the scope of the invention.

What is claimed is:

1. In clamping apparatus for supporting a metal tube from fixed structure, wherein (a) a split metal sleeve with raised end shoulders comprises identical interlocking halves of greater than 180° total extent such that each half has self-retaining snap-action assembly capability in respect of the same metal tube, and wherein (b) a fixedly mountable loop clamp surrounds the sleeve with axial play between the end shoulders, the loop clamping being so sized when clamped to said sleeve as to establish a predetermined frictional resistance to sleeve displacement with respect to said clamp, the improvement wherein each of the sleeve halves has a thin layer of friction material bonded thereto, said friction material comprising an uncured nitrite rubber-phenolic resin adhesive which incorporates its curing agents, the bore of the lined sleeve halves being compressed in engagement with the metal tube such that the frictional resistance to displacement of the sleeve on the metal tube is greater than the frictional resistance to sleeve displacement with respect to said clamp, said adhesive being curable to establish a bond of said sleeve to said metal tube in the presence of minimum ambient temperature in the order of 300° F., whereby in aircraft application in the vicinity of an engine with ambient temperatures of at least 300° F., where displacement accommodation of the sleeve on a metal tube is not desirable, said sleeve will become bonded to the metal tube upon operation of the engine; and further whereby in aircraft application in wing or the like structure which is subject to flexure and which is characterized by lesser ambient temperatures, said sleeve will not become bonded to the metal tube but rather will remain capable of displacement on the metal tube for such unusual situations of axial play as the clamp-to-sleeve engagement will not accommodate.

2. In clamping apparatus for supporting a metal tube from fixed structure, wherein a split metal sleeve is applied to the metal tube and a fixedly mountable loop clamp surrounds the sleeve, the loop clamp being so sized when clamped to said sleeve as to establish a predetermined frictional resistance to sleeve displacement with respect to said clamp, the improvement wherein each of the sleeve halves has a thin layer of friction material bonded thereto, said friction material having incorporated therein an uncured thermosetting resin adhesive, the resin adhesive being selected for ability to cure at a minimum ambient temperature of about 300° F. and to withstand temperatures well in excess of 300° F.

3. The improvement of claim 2, in which the ability to cure at 300° F. is in the added context of clamp-set compressional pressure on the friction material.

4. The improvement of claim 3, in which said compressional pressure is at least 100 psi.

* * * * *